(12) United States Patent
Gardner

(10) Patent No.: US 11,435,173 B1
(45) Date of Patent: Sep. 6, 2022

(54) NON-PLANER MEASUREMENT SYSTEM AND METHOD OF USE

(71) Applicant: Christopher B Gardner, Fort Worth, TX (US)

(72) Inventor: Christopher B Gardner, Fort Worth, TX (US)

( * ) Notice: Subject to any disclaimer, the term of this patent is extended or adjusted under 35 U.S.C. 154(b) by 0 days.

(21) Appl. No.: 17/017,371

(22) Filed: Sep. 10, 2020

(51) Int. Cl.
*G01B 3/1003* (2020.01)

(52) U.S. Cl.
CPC ............................ *G01B 3/1003* (2020.01)

(58) Field of Classification Search
CPC ...................................................... G01B 3/1003
USPC .......................................... 33/416, 565, 759
See application file for complete search history.

(56) References Cited

U.S. PATENT DOCUMENTS

| | | | | | |
|---|---|---|---|---|---|
| 2,579,664 | A | * | 12/1951 | Gleasman | G01B 3/04 33/492 |
| 3,173,212 | A | * | 3/1965 | Fredrickson | G11B 27/34 33/494 |
| 3,805,390 | A | * | 4/1974 | Craig | B43L 9/007 33/27.03 |
| 3,823,481 | A | * | 7/1974 | Chapin | G01B 3/1071 33/429 |
| 4,499,666 | A | * | 2/1985 | Smith | B25H 7/02 33/194 |
| 5,813,127 | A | * | 9/1998 | Blevins | G01B 3/04 33/492 |
| 6,098,301 | A | * | 8/2000 | Kapphahn | G01B 3/04 33/492 |
| 6,378,223 | B1 | * | 4/2002 | Korich | G01B 3/02 33/649 |
| 6,889,442 | B2 | * | 5/2005 | Bouvier | B63B 71/00 33/492 |
| 7,574,813 | B1 | * | 8/2009 | Boutan | E04F 21/0069 33/471 |
| 7,882,643 | B1 | * | 2/2011 | Portinen | E04F 21/1838 33/474 |
| 8,813,381 | B2 | * | 8/2014 | Platt | A41H 3/01 33/566 |
| 9,376,817 | B2 | * | 6/2016 | Walker | E04G 21/1891 |
| 10,449,684 | B2 | * | 10/2019 | Wadkins | B29C 66/1142 |
| 11,028,511 | B1 | * | 6/2021 | Neill | D05C 9/06 |
| 2001/0034954 | A1 | * | 11/2001 | Medford | E04D 15/025 33/759 |
| 2003/0204963 | A1 | * | 11/2003 | Siefert | G01B 3/563 33/429 |
| 2006/0000104 | A1 | * | 1/2006 | Patton | G01B 3/10 33/755 |
| 2007/0119067 | A1 | * | 5/2007 | Mackey | G01B 3/20 33/613 |
| 2009/0265949 | A1 | * | 10/2009 | Ruppe, III | G01B 3/14 33/563 |

(Continued)

FOREIGN PATENT DOCUMENTS

WO WO-2012094717 A1 * 7/2012 ............. B43L 9/007

*Primary Examiner* — Yaritza Guadalupe-McCall
(74) *Attorney, Agent, or Firm* — Leavitt Eldredge Law Firm

(57) ABSTRACT

A non-planer measurement system allows for a tape measure or ruler to nest in along the top surface of an object such as a roof panel. The tape has cutouts to fit the pattern so that the whole edge with the cutouts nests with the surface of the roof panel. The tape then allows for accurate distance measurements along the tape.

3 Claims, 5 Drawing Sheets

(56) References Cited

U.S. PATENT DOCUMENTS

| | | | | |
|---|---|---|---|---|
| 2009/0265951 | A1* | 10/2009 | Black | G01B 3/1003 33/759 |
| 2011/0078913 | A1* | 4/2011 | Schneider | G01B 3/04 33/476 |
| 2013/0036618 | A1* | 2/2013 | Wall | G01B 3/38 33/494 |
| 2013/0180119 | A1* | 7/2013 | Prince | G01B 5/24 33/645 |
| 2016/0201344 | A1* | 7/2016 | Briganti | E04G 21/1891 33/494 |
| 2020/0249005 | A1* | 8/2020 | Crockett | B25H 7/00 |

* cited by examiner

NON-PLANER MEASUREMENT SYSTEM AND METHOD OF USE

BACKGROUND

1. Field of the Invention

The present invention relates generally to measurement systems and methods, and more specifically, to a hand-held measurement tool that improves and facilitates the measurement process on surfaces that are not flat, smooth, or otherwise difficult to measure.

2. Description of Related Art

Measurement systems are well known in the art and are an effective means to tabulate or quantify a physical aspect of an object such as length. For example, referring to FIG. 1, a roof panel 103 with peaks 105 and valleys 107 is depicted. These roof panels are often made of sheet metal and come in several industry standard profiles. Commonly, a measuring tape 101 is used to mark out or otherwise determine where the panel 103 should be trimmed, cut, or otherwise altered.

One of the problems commonly associated with common measurement systems is their limited efficiency. For example, when a linear measurement 113 is needed from the end 115 of the tape 109 there exists a gap 111 between the tape 109 and the panel 103 because of the peak 105. This gap 111 necessitates inaccurate methods to identify the location on the panel such as projecting the mark from the tape downward by sight, the use of a writing implement to align with the tape and then mark on the panel, and the like. These methods cause measurement errors that lead to material waste if measurement 113 is not made correctly.

These measurements 113 are used to create structures in the case of roof panels 103 and must be accurate to allow the structure to function as designed.

Accordingly, although great strides have been made in the area of measurement systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
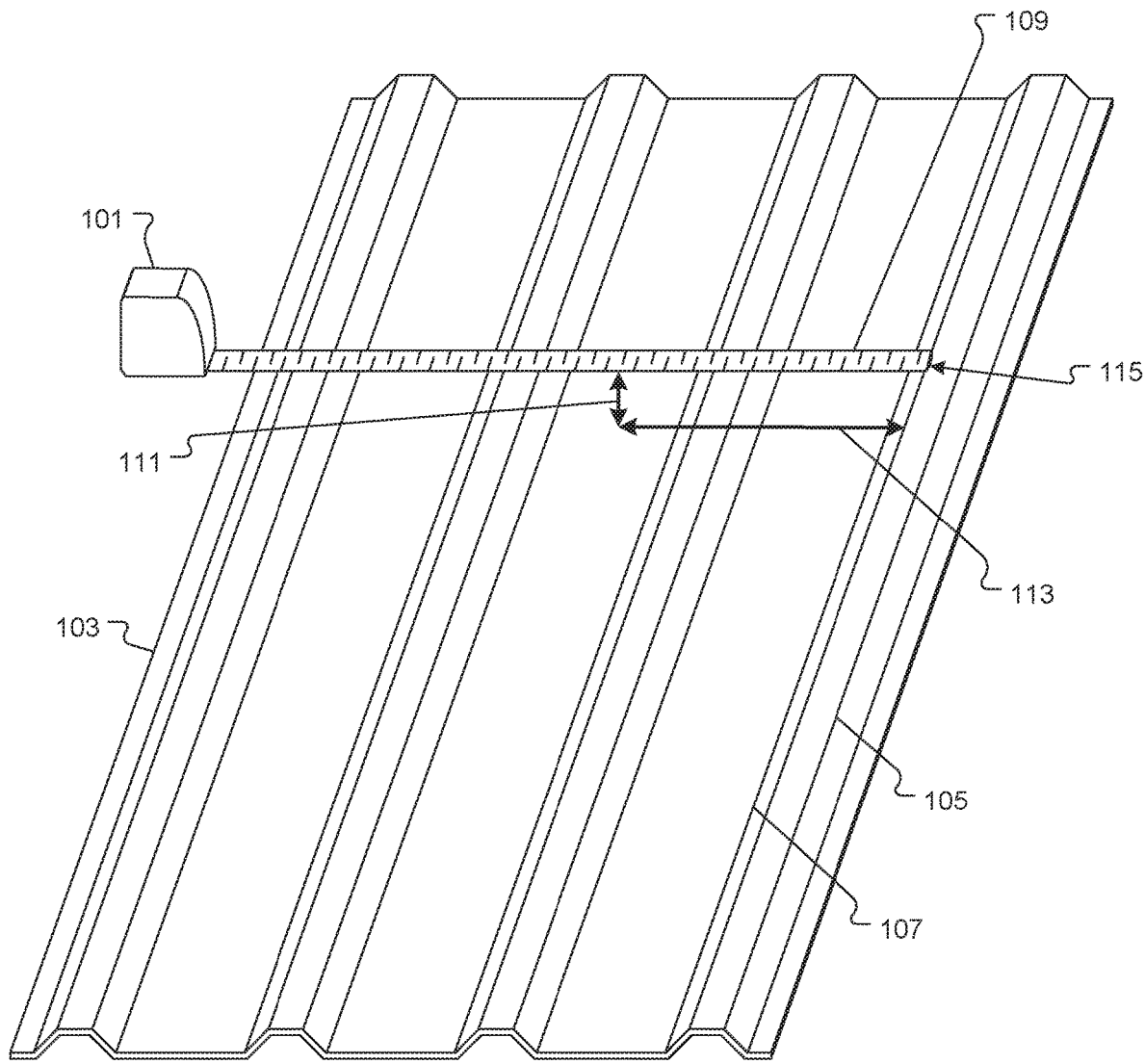
FIG. 1 is a front isometric view of a roof panel and tape measure as are common in the art.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional measurement systems. Specifically, the present invention provides a means to obtain and mark distances on the surface of an object with a repeating pattern. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
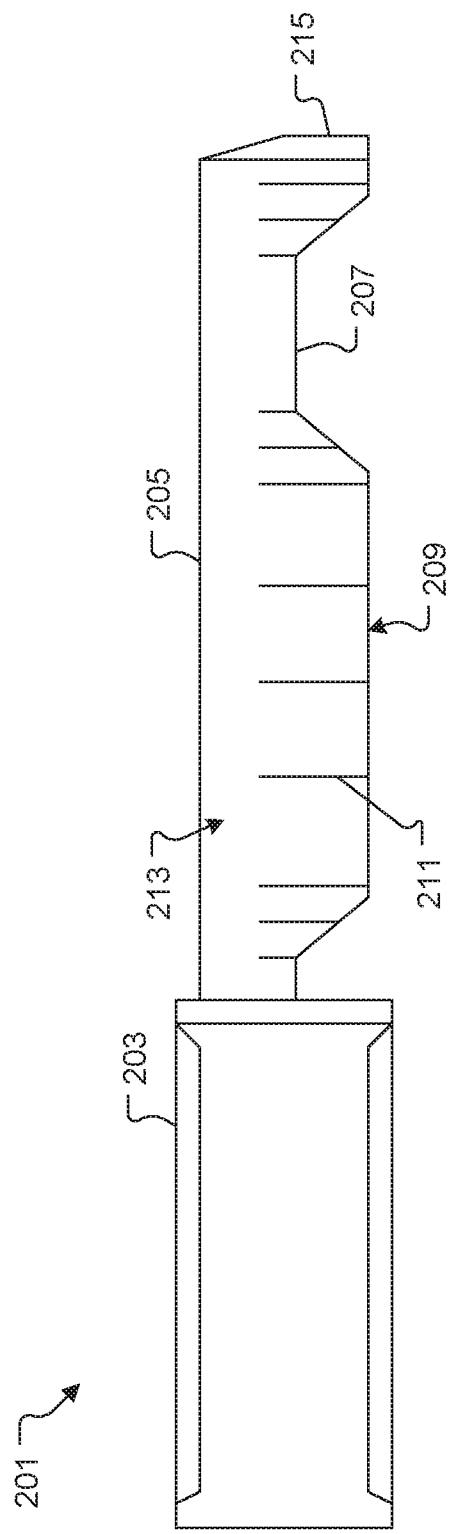
FIG. 2 is a top view of a non-planer measurement system in accordance with a preferred embodiment of the present application.

Referring now to the drawings wherein like reference characters identify corresponding or similar elements throughout the several views, FIG. 2 depicts a top view of a non-planer measurement system in accordance with a preferred embodiment of the present application. It will be appreciated that system 201 overcomes one or more of the above-listed problems commonly associated with conventional measurement systems.

In the contemplated embodiment, system 201 includes a holder 203 such as a tape measure canister with a tape 205 that extends therefrom and stored therein. The tape 205 has cutouts 207 the extend in the tape from a first edge 209. The tape 205 also has markings 211 on the top surface 213 thereof. It is contemplated that an anchor 215 is attached to the end of the tape 205 to facilitate the placement of the tape 205.

It is contemplated the cutouts 207 while depicted with a tape could also be integrated with any physical measurement tool such as a ruler, yardstick, straight edge, or the like and that the embodiment provided introduces the concept and does not limit its implementation. Further, it is contemplated that tape or other measuring tool could be flexible in the vertical axis and rigid in the horizontal axis. Additionally, markings 211 could be placed on any side or surface of the tape 205.

Figure 3:
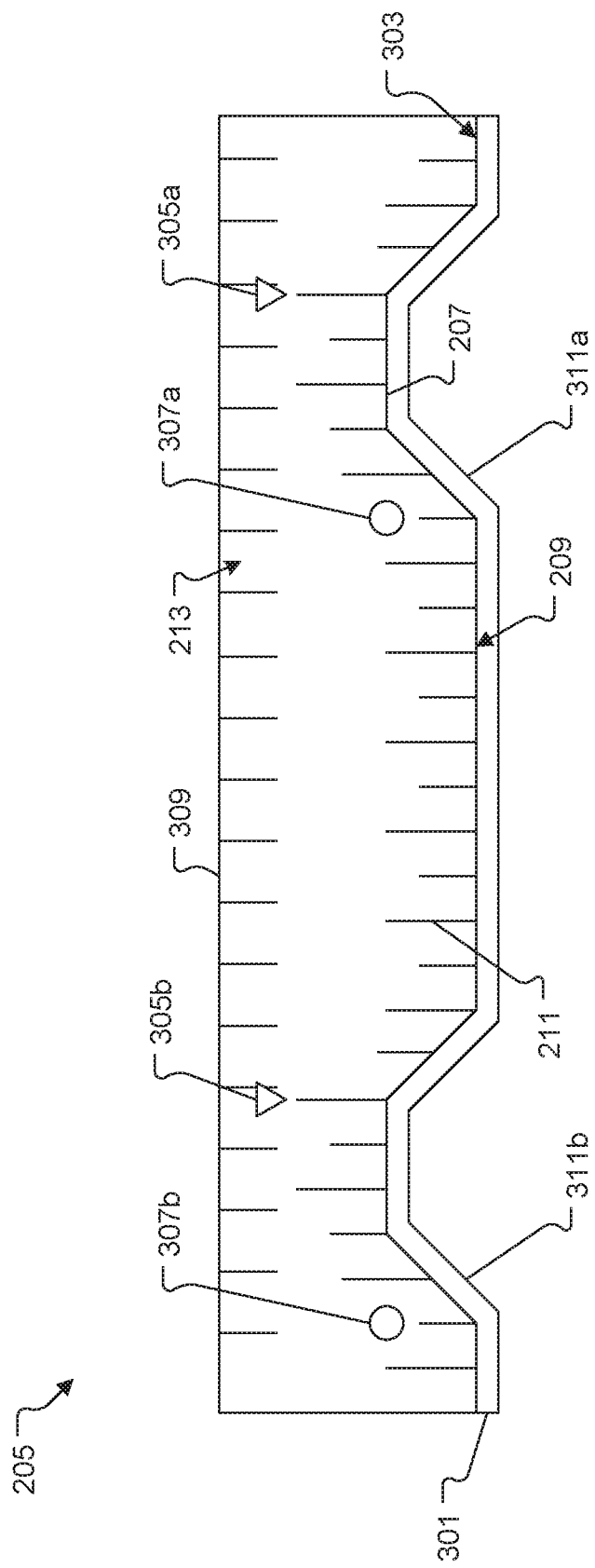
FIG. 3 is a top view of the tape of FIG. 2.

In use, as depicted by FIG. 3, the tape 205 is placed on a non-planer object such as roof panel 301, sheet metal profile, or the like. Where the tape 205 includes a body 309 with the cutouts 207 that align with the peaks 311 of the panel 301 so that the first edge 209 of the body 309 of the tape 305 rests on the top surface 303 of the panel 301. The first edge 209 of the tape 205 sits so that there is no gap between the tape 205 and the panel 301 so that an accurate measurement is taken with the markings 211.

It is also contemplated that peak indicators 305 could be placed on the top surface 213 so that the distance from a peak 311 could quickly determine. Likewise, it is contemplated that valley indicators 307 could also be placed on the top surface 213 of the tape 205 to quickly determined the distance from a valley.

It will be understood that other common tools and techniques in the art of measurement tools could be incorporated with the system 201. For example, magnetic tip and belt holders, lasers, illumination devices, and the like.

Figure 4:
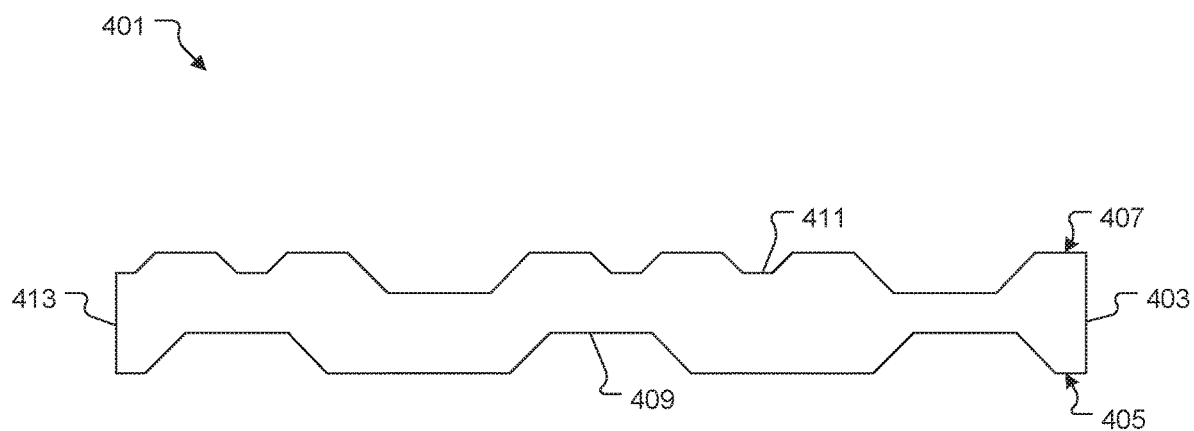
FIG. 4 is a top view of an alternative embodiment of the tape of FIG. 2.

Referring now to FIG. 4 an alternative embodiment of the tape 205 is depicted. Embodiment 401 includes a tape 403 that includes a body 413 with a first edge 405 and a second edge 407 opposite therefrom. The first edge 405 has cutouts that form a first pattern 409 and the second edge 407 has cutouts that form a second pattern 411. It is contemplated that any markings could be unique to each pattern.

It should be appreciated that one of the unique features believed characteristic of the present application is that the cutouts 207 in the body 309 of the tape 205 allow the tape to follow the contour of a patterned surface such as that of a roof panel 301 and thus make, make, take, or otherwise measure a linear distance on a non-planer surface.

Figure 5:
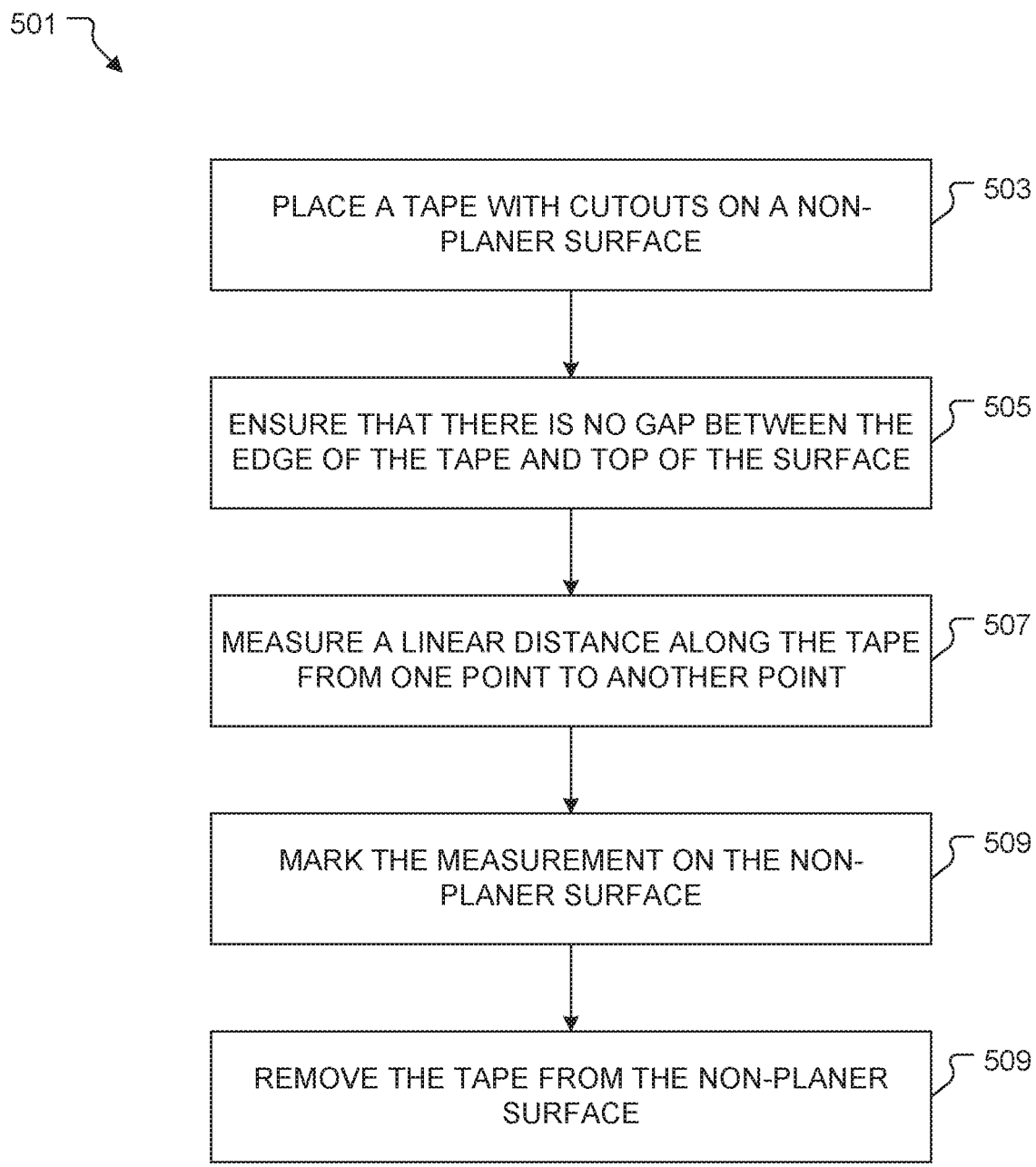
FIG. 5 is a flowchart of a method of measuring a non-planer surface.

Referring now to FIG. 5 a method of measuring a non-planer surface is depicted. Method 501 includes placing a tape with cutouts on a non-planer surface 503, ensuring that there is no gap between the edge of the tape and the top of the surface 505, measuring a linear distance along the tape from one point to another point 507, marking the measurement on the non-planer surface 509 and removing the tape from the non-planer surface 511.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A non-planer measurement system comprising:
   a body that forms a elongated tape with a first edge and a second edge, the first edge opposing the second edge;
   a plurality of cutouts extending from the first edge towards the second edge, the first edge forming a pattern;
   the second edge having no cutouts and forming a linear edge; and
   a plurality of markers on a front surface of the body, the plurality of markers being equal distant from each other and follow a contouring of the plurality of cutouts;
   wherein the pattern of cutouts allows the first edge to rest on a non-planer surface; and
   wherein the tape is configured to enable the measurement of a linear distance along the tape.

2. The system of claim 1 wherein the pattern of cutouts conforms to the pattern of a roof panel.

3. A method of measuring a non-planer surface, comprising:
   providing the system of claim 1;
   ensuring that there is no gap between the edge of the tape and the top of the surface;
   measuring a linear distance along the tape from one point to another point;
   marking the measurement on the non-planer surface; and
   removing the tape from the non-planer surface.

* * * * *